United States Patent
Miyahara

(10) Patent No.: US 10,627,767 B2
(45) Date of Patent: Apr. 21, 2020

(54) IMAGE FORMING APPARATUS THAT PRINTS IMAGE

(71) Applicant: CANON KABUSHIKI KAISHA, Tokyo (JP)

(72) Inventor: Nobuaki Miyahara, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 555 days.

(21) Appl. No.: 15/278,303

(22) Filed: Sep. 28, 2016

(65) Prior Publication Data
US 2017/0090387 A1 Mar. 30, 2017

(30) Foreign Application Priority Data
Sep. 30, 2015 (JP) .................. 2015-193426

(51) Int. Cl.
| | | |
|---|---|---|
| G03G 15/00 | (2006.01) | |
| B41J 13/00 | (2006.01) | |
| B41J 3/60 | (2006.01) | |
| G03G 15/23 | (2006.01) | |
| H04N 1/00 | (2006.01) | |
| H04N 1/387 | (2006.01) | |

(52) U.S. Cl.
CPC ............ *G03G 15/6529* (2013.01); *B41J 3/60* (2013.01); *B41J 13/0009* (2013.01); *G03G 15/234* (2013.01); *H04N 1/0057* (2013.01); *H04N 1/00567* (2013.01); *H04N 1/00575* (2013.01); *H04N 1/00639* (2013.01); *G03G 2215/00438* (2013.01); *G03G 2215/00586* (2013.01); *H04N 1/3877* (2013.01)

(58) Field of Classification Search
CPC ............... G03G 15/231; G03G 15/234; G03G 2215/0043; G03G 2215/00438; B65H 2301/333
See application file for complete search history.

(56) References Cited

U.S. PATENT DOCUMENTS 7,120,382 B2  10/2006  Shimizu et al.

FOREIGN PATENT DOCUMENTS

| JP | 2001326810 A | | 11/2001 |
| JP | 2002223336 A | * | 8/2002 |
| JP | 2005338544 A | * | 12/2005 |

OTHER PUBLICATIONS

Ueda et al. (JP 2005-338544 A), Oct. 2004, JPO Computer Translation (Year: 2004).*

* cited by examiner

*Primary Examiner* — Erika J Villaluna
(74) *Attorney, Agent, or Firm* — Rossi, Kimms & McDowell LLP

(57) ABSTRACT

An image forming apparatus capable of making a match between the orientation of a reference side of a sheet along which punched holes are formed and the orientation of an output image on the sheet in double-sided printing. It is determined whether or not to rotate an image based on whether the image is printed in a single-sided printing mode or a double-sided printing mode. In the double-sided printing mode, a reverse-side image is printed on a first surface of the sheet, the sheet is conveyed into the printing section through a double-sided conveying path, a front-side image is printed on a second surface of the sheet, and the sheet is discharged. In the single-sided printing mode, an image for single-sided printing is printed on a first surface of the sheet, and the sheet is discharged.

8 Claims, 13 Drawing Sheets

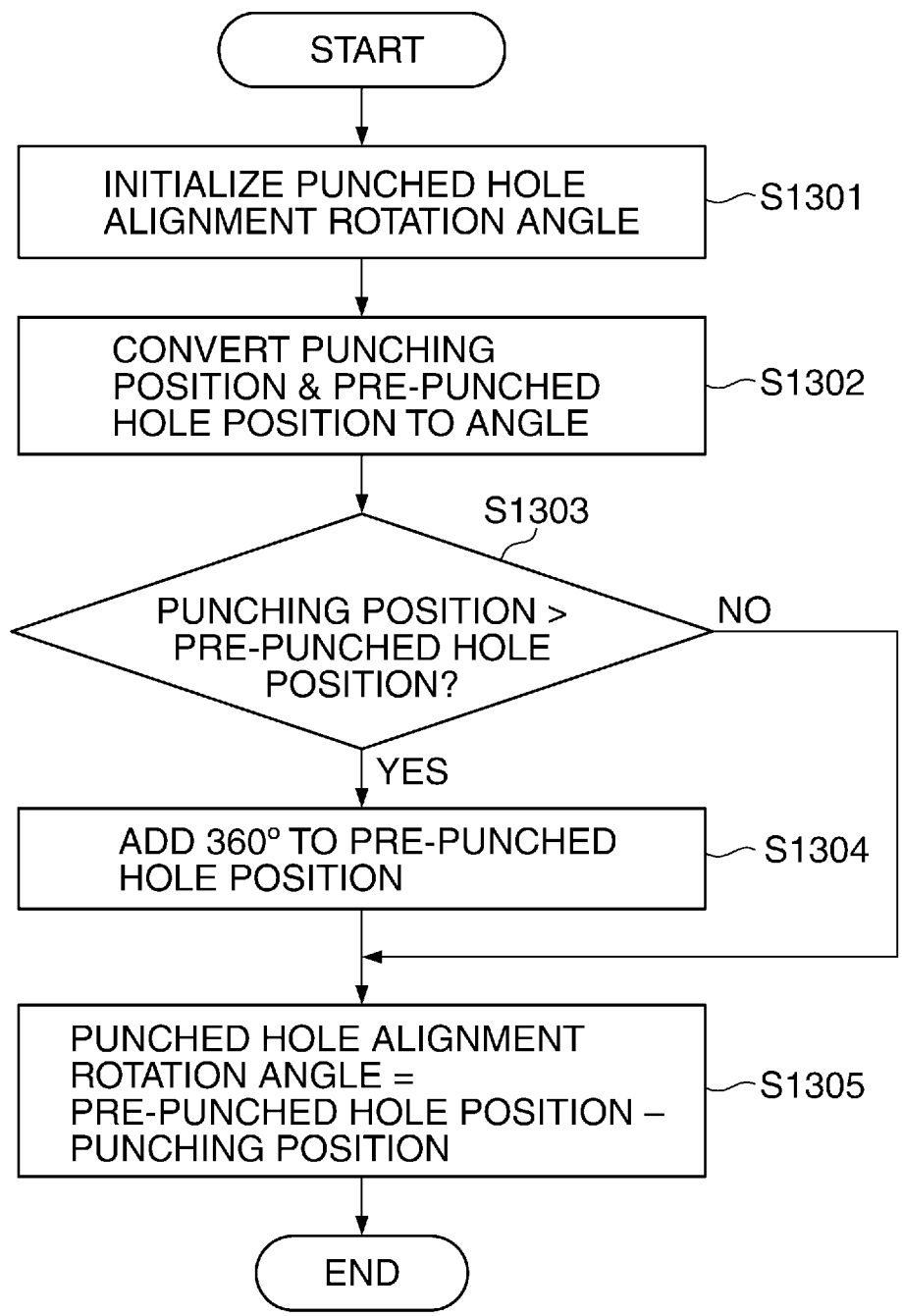

IMAGE FORMING APPARATUS THAT PRINTS IMAGE

BACKGROUND OF THE INVENTION

Field of the Invention

The present invention relates to an image forming apparatus that prints an image.

Description of the Related Art

Conventionally, there has been known an image forming apparatus, such as a multi-function peripheral and a printer, that is capable of freely switching sheet discharge between face-up discharge and face-down discharge when discharging a sheet onto a discharge tray, by providing an inversion path at a location upstream of a discharge outlet. Further, as an image forming apparatus which is compact in size and performs print processing at a slightly low speed, there is proposed one that has achieved size reduction by omitting the inversion path upstream of the discharge outlet so as to reduce the size of the apparatus. In a case where the inversion path is not provided upstream of the discharge outlet, it is impossible to determine an upward-facing side of a discharged sheet, during the conveying of the sheet for discharging the same onto the discharge tray. To cope with this, there is proposed an apparatus that is configured to make use of a mechanism for double-sided printing, to thereby convey a sheet using a double-sided path (double-sided printing conveying path) so as to change the surface of a sheet on which an image is actually printed, whereby the upward-facing side of the discharged sheet is changed.

For example, in a case where an apparatus configured such that when a sheet subjected to single-sided printing is discharged as it is, the sheet is discharged by "face-down discharge" in which a surface of the sheet having an image formed thereon faces downward on the discharge tray, in order to discharge a sheet by "face-up discharge", an image is printed on a first surface of the sheet, whereafter the sheet is conveyed along the double-sided path and is discharged without performing printing on a second surface of the sheet. On the other hand, by using the same apparatus, in order to discharge a sheet by face-down discharge according to a double-sided printing job, an image for the reverse side is first printed on a first surface of the sheet, and then an image for the front side is printed on a second surface of the sheet, whereby the sheet is discharged by face-down discharge. If a sheet printed according to a single-sided printing job is discharged by face-up discharge, and a sheet printed according to a double-sided printing job is discharged by face-down discharge, the facing direction of the first surface is opposite between the case of single-sided printing and the case of double-sided printing. To cope with this, in a case where a mixed job mixedly including single-sided printing and double-sided printing is executed on sheets having different directional properties between the front side and the reverse side thereof, such as pre-printed sheets on which an image has been printed in advance, each sheet to be printed by single-sided printing is conveyed through the double-sided path to thereafter print an image for the front side thereof on the second surface thereof, whereby the sheet is discharged by face-down discharge. This makes it possible to make a match in the printed surface between the case of double-sided printing and the case of single-sided printing (cause the first surfaces of the respective sheets to face in the same direction).

On the other hand, there has been known an image forming apparatus that is capable of performing printing on a sheet having directional properties with respect to the orientations (facing directions) of the four sides thereof, such as a pre-punched sheet on which punching has been performed in advance. For example, the pre-punched sheet has punched holes formed in the vicinity of one of the four sides, and the directional properties of the sheet are defined depending on the orientation of the side along which the punched holes are formed. For example, in a case where the side along which the punched holes are formed is oriented (faces) in a direction orthogonal to the conveying direction, whether the side along which the punched holes are formed is at a leading end of the sheet or at a trailing end of the same in the conveying direction has an influence on the relationship between the top and bottom of the sheet and the top and bottom of an image formed thereon. As to such sheets having directional properties, the orientation of sheets set in the sheet feeder has to be changed depending on the sheet conveying path of a printer. To cope with this, there has been proposed an image forming apparatus that allows a user to set sheets having directional properties in the sheet feeder without paying attention to the orientation of the sheets set therein (see Japanese Patent Laid-Open Publication No. 2001-326810). However, in this publication, no description has been made as to double-sided printing, and particularly, there is no reference to a problem of making a match between the orientation of a reference side of a sheet along which punched holes are formed and the orientation of an output image on the sheet, in double-sided printing.

SUMMARY OF THE INVENTION

The present invention provides an image forming apparatus that is capable of making a match between the orientation of a reference side of a sheet along which punched holes are formed and the orientation of an output image on the sheet in double-sided printing.

In a first aspect of the present invention, there is provided an image forming apparatus comprising a sheet feeder configured to feed a sheet having punched holes, a printer configured to print an image on the sheet fed from the sheet feeder, a double-sided conveying path for inverting the sheet on which an image has been printed, and conveying the sheet into the printer, and a controller configured to rotate an image for double-sided printing by 180 degrees and control the printer to print the rotated image, wherein the controller is configured to control the printer to print an image for single-sided printing without rotation by 180 degrees.

In a second aspect of the present invention, there is provided an image forming apparatus comprising a sheet feeder configured to feed a sheet having punched holes, a printer configured to print an image on the sheet fed from the sheet feeder, a double-sided conveying path for inverting the sheet on which an image has been printed, and conveying the sheet into the printer, and a controller configured to rotate an image for single-sided printing by 180 degrees and control the printer to print the rotated image, wherein the controller is configured to control the printer to print an image for double-sided printing without rotation by 180 degrees.

Further features of the present invention will become apparent from the following description of exemplary embodiments (with reference to the attached drawings).

BRIEF DESCRIPTION OF THE DRAWINGS

FIG. 13 is a flowchart of a process for calculating a rotation angle for punched hole alignment, which is performed in a step in the image rotation angle determination process in FIG. 12.

DESCRIPTION OF THE EMBODIMENTS

The present invention will now be described in detail below with reference to the accompanying drawings showing embodiments thereof.

Figure 1:
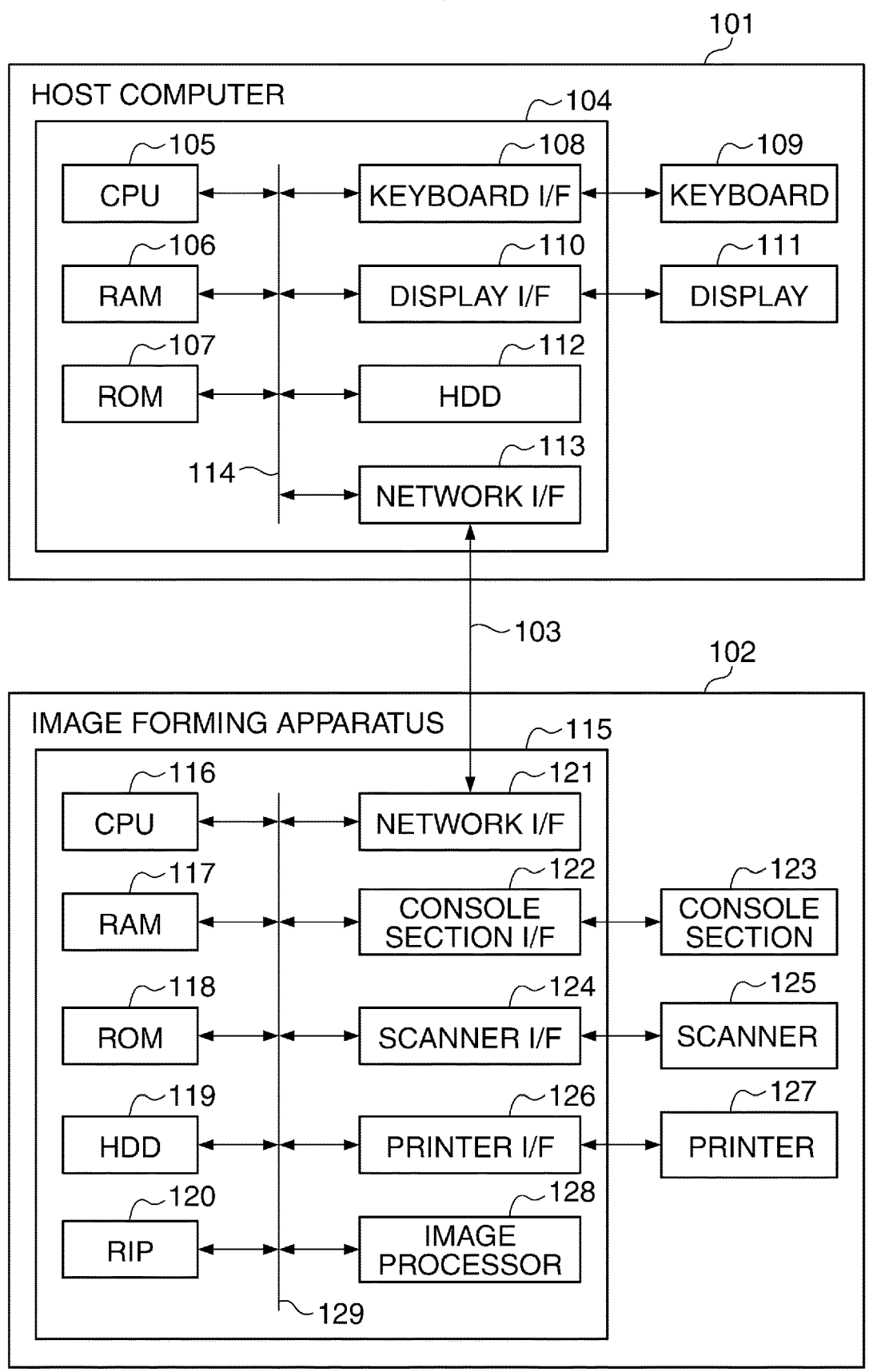
FIG. 1 is a block diagram showing a hardware configuration of an image processing system including an image forming apparatus according to a first embodiment of the present invention.

FIG. 1 is a block diagram showing a hardware configuration of an image processing system including an image forming apparatus according to a first embodiment of the present invention. The image processing system is formed by the image forming apparatus, denoted by reference numeral 102, and a host computer 101, which are connected via a network 103. The host computer 101 includes a computer main unit 104, a keyboard 109, and a display 111. In the computer main unit 104, a CPU 105 performs centralized control of devices connected to a system bus 114. The CPU 105 performs document processing on data in which graphics, images, characters, tables (including calculation), etc., are mixed, according to a document processing program and the like stored in a ROM 107 or a hard disk drive (HDD) 112. The ROM 107 or the HDD 112 stores an operating system program (OS) which is a control program executed by the CPU 105, and so forth. The ROM 107 or the HDD 112 stores font data and various kinds of data, which are used for the above-mentioned document processing. A RAM 106 functions as a main memory and a work area for the CPU 105. A keyboard interface 108 controls key input from the keyboard 109, a pointing device and the like, not shown, connected thereto. A display interface 110 controls the display on the display 111 connected thereto. A user can configure print settings and give a print instruction to the image forming apparatus 102, using the display on the display 111 and the input from the keyboard 109. When the print instruction is given to the image forming apparatus 102, a print job is delivered from a network interface 113 to the image forming apparatus 102 via the network 103. This print job includes print settings, such as settings of double-sided printing and finishing, and image data expressed by a page description language (PDL) or the like.

Figure 3:
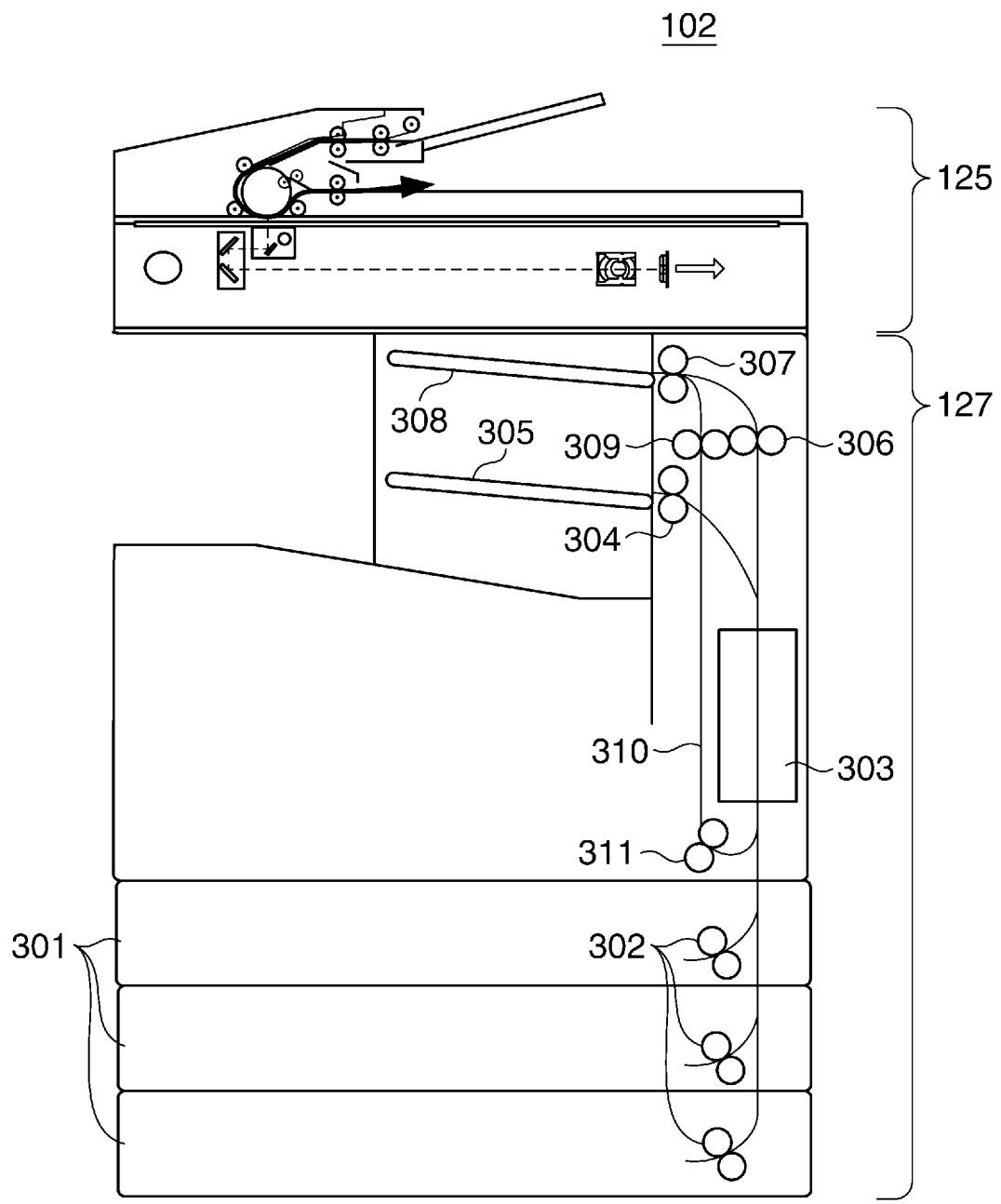
FIG. 3 is a schematic cross-sectional view of the image forming apparatus.

The image forming apparatus 102 includes an image controller 115, a console section 123, a scanner 125 (see FIG. 3 as well) and a printer 127 (see FIG. 3 as well). In the image controller 115, a CPU 116 as control means performs centralized control of devices connected to a system bus 129 to thereby control copying as well as printing instructed from the host computer 101. A ROM 118 stores various parameters and programs necessary for performing image processing. A RAM 117 functions as a main memory and a work area for the CPU 116, and is also used as a buffer area for storing scanned image data, image data to be printed, and the like. An HDD 119 temporarily stores print data received by a network interface 121, and is accessed from modules, as a swap area for a raster image processor (RIP) 120 and an image processor 128. The RIP 120 converts page description language (PDL) data to raster image data.

A console section interface 122 controls key input from the console section 123 connected thereto, and displays an output to the console section 123. The console section 123 includes hard keys and a touch panel, and is capable of displaying a status of the image forming apparatus 102 and enabling a user to operate the image forming apparatus 102. A scanner interface 124 controls the scanner 125 connected thereto, transmits and receives a control command to and from the scanner 125, and receives an image optically scanned by the scanner 125. The scanner 125 optically scans an original. A printer interface 126 controls the printer 127 connected thereto, transmits and receives a control command to and from the printer 127, and transmits an image to be printed by the printer 127. The image processor 128 performs image processing, such as scaling, image rotation, color conversion, and smoothing, on an image scanned by the scanner 125 and an image generated by the RIP 120.

Figure 2:
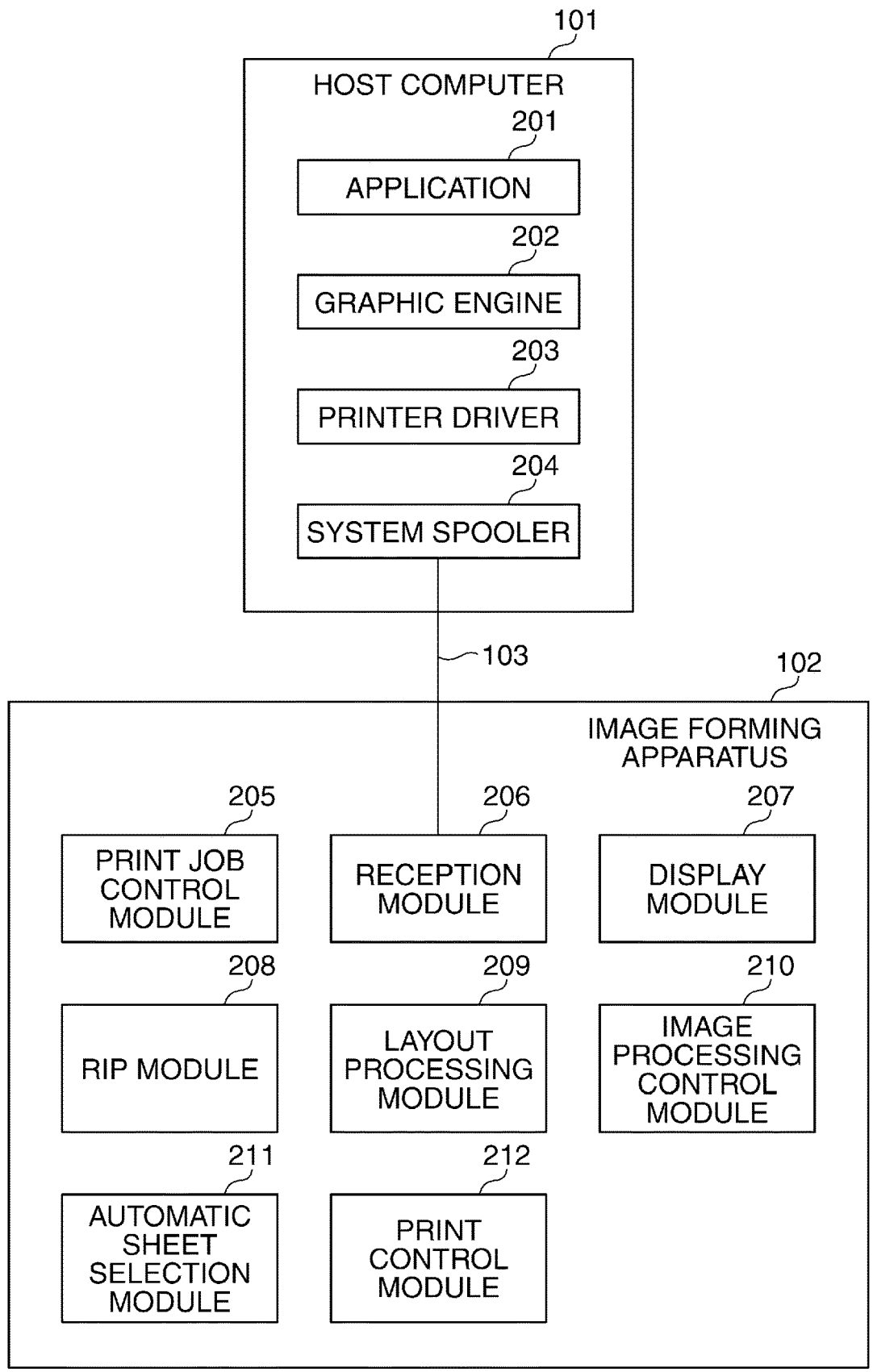
FIG. 2 is a block diagram showing a software configuration concerning print processing.

FIG. 2 is a block diagram showing a software configuration concerning print processing by the image processing system.

An application 201, a graphic engine 202, a printer driver 203, and a system spooler 204, which operate on the host computer 101, exist as files stored in the HDD 112. When executing these program modules, each of them is loaded into the RAM 106 by the OS or another module which uses the module, for execution. When giving an instruction for printing from the application 201 to the image forming apparatus 102, the application 201 outputs (draws) image data to the image forming apparatus 102 using the graphic engine 202. The graphic engine 202 uses the printer driver 203 prepared on an image forming apparatus basis, to generate a print job based on the output from the application 201. The print job includes print settings, such as settings of double-sided printing and a sheet to be used, and page description language (PDL) data. The printer driver 203 also performs determination of the order of pages, layout of each page, and synthesis of a plurality of pages, based on the print settings. The print job generated by the printer driver 203 is output to the image forming apparatus 102 via the system spooler 204 and the network interface 113.

Program modules, denoted by reference numerals 205 to 212, which operate on the image forming apparatus 102, are stored in the ROM 118, and are each loaded into the RAM 117, for execution. The print job control module 205 manages a print job received by the reception module 206 via the network interface 121, and controls the modules denoted by reference numerals 207 to 212 to perform print processing. The display module 207 causes the console section 123 to display e.g. a status of a print job. The display module 207 also causes the console section 123 to display a notification notifying a user of sheet shortage, a jam, or the like, to thereby prompt the user to perform a necessary operation. The RIP module 208 uses the RIP 120 to convert PDL data to raster image data. The layout processing module 209 determines how to lay out an image with respect to a sheet, based on the print settings. For example, the layout processing module 209 determines whether to print a normal image or an inverted image on a reverse side of a sheet according to settings of double-sided printing, and performs centering or the like processing of an image in a case where the size of a sheet and the size of the image do not match. The image processing control module 210 uses the image processor 128 (see FIG. 1) to perform image processing, such as scaling, image rotation, color conversion, and smoothing. The automatic sheet selection module 211 automatically selects a sheet feeder storing optimum sheets from a plurality of (three, in the case of the example illustrated in FIG. 3) sheet feeders 301 according to a specified sheet size or an image size. The print control module 212 controls the printer 127 to perform print processing.

FIG. 3 is a schematic cross-sectional view of the image forming apparatus 102. The printer 127 is provided with the three sheet feeders 301 each storing sheets. The number of the sheet feeders 301 is not limited to three. Feed rollers 302 each feed sheets stored in the sheet feeders 301 to a printing section 303. The printing section 303 prints an input image input e.g. as a print job, on a sheet fed thereto. The printing section 303 may be based on an ink-jet method for printing an image by injecting ink onto a sheet or an electrophotographic method for printing an image by fixing toner onto a sheet. The printing section 303 performs printing on a left side surface, as viewed in FIG. 3, of a sheet passing through the printing section 303.

Here, in a case where double-sided printing is performed or like cases, a printed sheet is sometimes printed again via a double-sided printing conveying path (hereinafter referred to as the "double-sided path") 310, which is a conveying passage for conveying sheets for double-sided printing. A surface of a sheet, which faces leftward, as viewed in FIG. 3, when the sheet passes through the printing section 303 for the first time, is referred to as the "first surface", and a surface of the sheet, which faces leftward, as viewed in FIG. 3, when the sheet passes through the printing section 303 for the second time after being conveyed via the double-sided path 310 is referred to as the "second surface". In a case where a sheet passes through the printing section 303 only once, such as a case where single-sided printing is normally performed, a surface of the sheet, which faces leftward, as viewed in FIG. 3, when the sheet passes through the printing section 303, is the first surface. In the present embodiment, a printed sheet is discharged basically by "face-down discharge". In a deliverable obtained by double-sided printing, an image printed or to be printed on a front side and an image printed or to be printed on a reverse side are referred to as the front-side image and the reverse-side image, respectively. In a case where face-down discharge is set, when a sheet subjected to single-sided printing is discharged, an output image faces downward, whereas when a sheet subjected to double-sided printing is discharged, a front-side image faces downward.

More specifically, in the case of single-sided printing, normally, a printed sheet is guided by a conveying roller 304 and is discharged onto a discharge tray 305. Therefore, the sheet having an image printed on the first surface by the printing section 303 from the left side as viewed in FIG. 3 is discharged onto the discharge tray 305 as it is, whereby face-down discharge in single-sided printing is realized.

On the other hand, in the case of double-sided printing, a reverse-side image is printed on the first surface of a sheet by the printing section 303, and the sheet is guided by a conveying roller 306 to a conveying roller 307. The conveying roller 307 conveys the sheet to an inversion tray 308. When a trailing edge of the sheet reaches the conveying roller 307, the conveying roller 307 starts reverse rotation to thereby convey the sheet to a conveying roller 309. The conveying roller 309 conveys the sheet to a conveying roller 311 through the double-sided path 310. The conveying roller 311 conveys the sheet to the printing section 303. The printing section 303 prints a front-side image on the second surface of the sheet. The sheet having the images thus printed on both sides is guided by the conveying roller 304 and is discharged onto the discharge tray 305. In the case of double-sided printing, the second surface printed later faces downward when the sheet is discharged onto the discharge tray 305. Assuming that a page 1 (front-side image) and a page 2 (reverse-side image) are printed in the mentioned order, the page 1 faces upward on the discharge tray 305, which results in face-up discharge. To overcome this problem, in double-sided printing, the CPU 116 first prints the page 2, which is the reverse-side image, on the first surface, and then prints the page 1, which is the front-side image, on the second surface, whereby face-down discharge is realized.

A description will be given of an example of face-down discharge in single-sided printing and double-sided printing, performed on pre-punched sheets with reference to FIGS. 4A to 4C, 5A and 5B, and 6A and 6B. A pre-punched sheet is a sheet which is stored in one of the sheet feeders 301 as a recording medium, and is formed with punched holes in advance. The punched holes formed in each pre-punched sheet are formed along a reference side, referred to hereinafter, at locations symmetrical with respect to the center of the reference side. Modes related to sheet conveying control (sheet conveying modes) include a "direct conveying mode" and an "inversion conveying mode". In the direct conveying mode, a sheet is caused to pass through the printing section 303 only once without being conveyed through the inversion tray 308 and the double-sided path 310. In the inversion conveying mode, a sheet is caused to pass through the printing section 303 twice via the inversion tray 308 and the double-sided path 310.

Figure 4A:
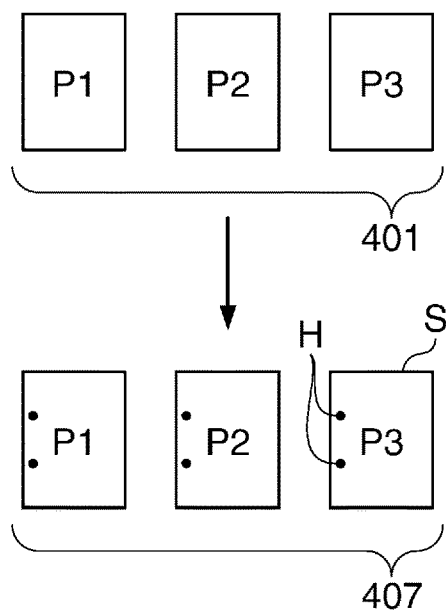
FIG. 4A is a schematic diagram of sheets on which single-sided printing is performed.
Figure 4B:
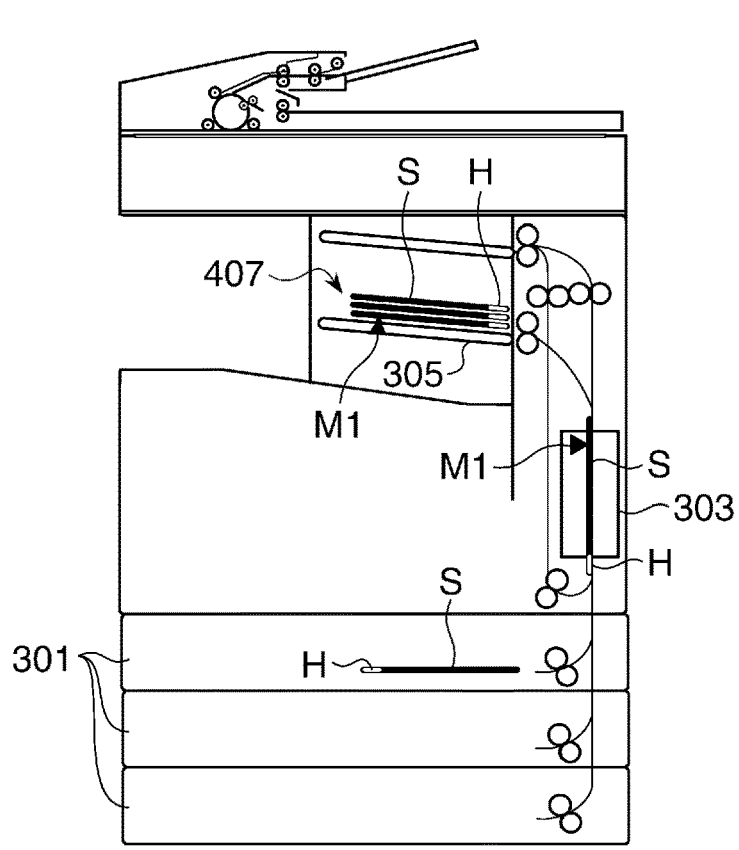
FIG. 4B is a cross-sectional view of the image forming apparatus during execution of a single-sided printing job.
Figure 4C:
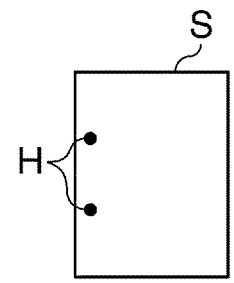
FIG. 4C is a diagram of a pre-punched sheet to be fed.

FIG. 4A is a schematic diagram of sheets on which single-sided printing is conventionally performed, FIG. 4B is a cross-sectional view of the image forming apparatus 102 during execution of a single-sided printing job, referred to hereinafter, and FIG. 4C is a diagram of a pre-punched sheet to be fed, In this example, a pre-punched sheet S is conveyed in the direct conveying mode, a front-side image (no reverse-side image exists) for single-sided printing is printed on the first surface of the pre-punched sheet S, and the pre-punched sheet S is discharged by face-down discharge. The single-sided printing job is a print job which does not include double-sided printing. For single-sided printing jobs, similar to the prior art, an operation described with reference to FIGS. 4A and 4B is also performed by the present embodiment.

A description will be given of an example in which single-sided printing of respective three pages of input images 401 on pre-punched sheets S is performed according to the single-sided printing job. Symbols P1, P2, P3 indicate page numbers, and each also indicate the vertical direction of an image printed thereon. For example, the top side of the page P1 indicates the top of the image printed thereon, and the bottom side of the page P1 indicates the bottom of the same. To obtain an output result of single-sided printing with left-side punching in which punched holes are on the left side (of the printed surface) of the sheet, as viewed in FIG. 4A, a user sets pre-punched sheets S in one of the sheet feeders 301 such that the punched holes H are positioned on the left side as viewed in FIG. 4B. When a pre-punched sheet S set as above is brought to the printing section 303, the punched holes H are positioned on the rear side of the pre-punched sheet S in the conveying direction. A black triangle mark M1 in FIG. 4B indicates the first surface of the sheet (pre-punched sheet S), on which an image is formed. Thus, the front-side images corresponding to the input image 401 are printed on the first surfaces of the pre-punched sheets S.

Incidentally, the pre-punched sheet S having a rectangular shape is an example of a predetermined sheet having directional properties with respect to the orientations (facing directions) of the four sides. To identify an orientation of the pre-punched sheet S, a side along which the punched holes H are formed is defined as the "reference side", and the orientation of the pre-punched sheet S is identified based on the orientation of the reference side of the four sides of the pre-punched sheet S. As for the pre-punched sheet S, an orientation of the reference side and an orientation of a side along which the punched holes H are formed (not a direction in which the punched holes H extend through the sheet) are used with the same meaning.

An output result 407 is a deliverable formed by the pre-punched sheets S discharged onto the discharge tray 305. A side of the four sides of each pre-punched sheet S, along which the punched holes H are formed, of the output result 407 faces rearward in the conveying direction. The front-side image printed on the first surface faces downward, and hence the sheet is discharged by face-down discharge. After printing is performed, the sheet is output such that the top of the front-side image faces toward the far side of the image forming apparatus 102, and hence, in the output result 407, the tops of the images on the pages P1, P2, and P3 face toward the far side of the image forming apparatus 102. Therefore, the output result 407 is "left-side punching output" in which the punched holes H are positioned on the left side of a image when the image is viewed from the front side of the sheet with the top of the image set on the top side.

Figure 5A:
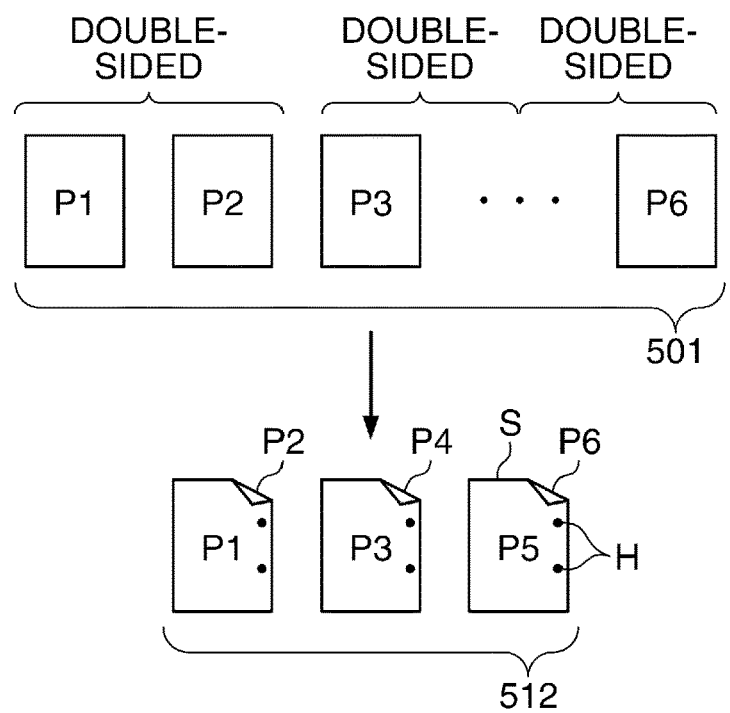
FIG. 5A is a schematic diagram of sheets on which double-sided printing is performed.
Figure 5B:
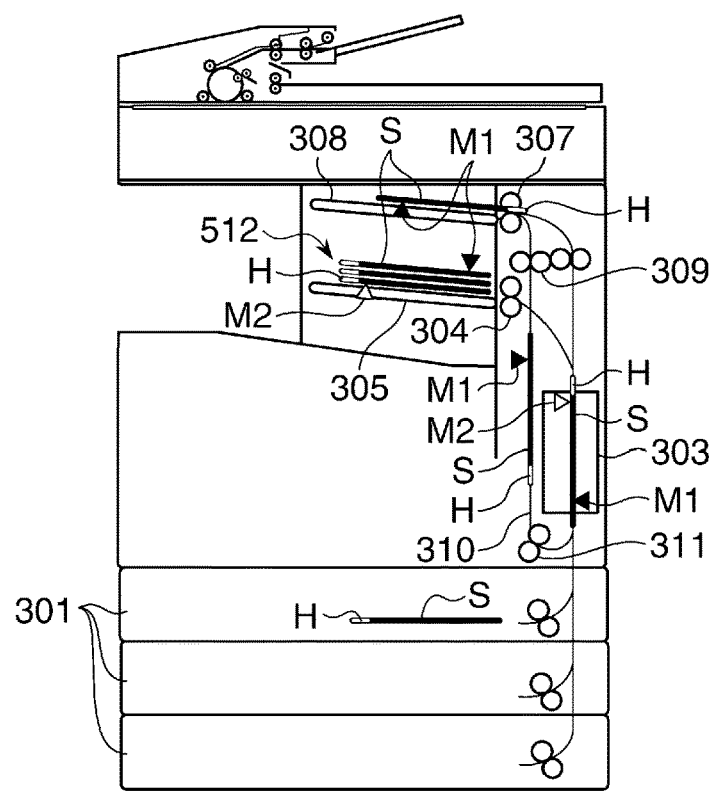
FIG. 5B is a cross-sectional view of the image forming apparatus during execution of a double-sided printing job.

FIG. 5A is a schematic diagram of pre-punched sheets on which double-sided printing is conventionally performed, and FIG. 5B is a cross-sectional view of the image forming apparatus 102 during execution of a double-sided printing job, referred to hereinafter. In this example, each pre-punched sheet S is conveyed in the inversion conveying mode, a reverse-side image is printed on the first surface of the pre-punched sheet S, and a front-side image is printed on the second surface of the same, whereafter the pre-punched sheet S is discharge by face-down discharge. The double-sided printing job is a print job which does not include single-sided printing.

A description will be given of an example in which double-sided printing of respective six pages of input images 501 on pre-punched sheets S is performed according to the double-sided printing job. Similar to the case of the single-sided printing job (see FIGS. 4A to 4C), the user sets pre-punched sheets S in one of the sheet feeders 301 such that the punched holes H are positioned on the left side as viewed in FIG. 5B. The pre-punched sheet S is conveyed into the printing section 303 in a state in which the punched holes H face toward the rear side in the conveying direction (not shown), and a reverse-side image is printed on the first surface, whereafter the pre-punched sheet S is conveyed to the inversion tray 308. On the inversion tray 308, the first surface of the pre-punched sheet S faces downward, that is, the pre-punched sheet S is in an inverted state. Then the pre-punched sheet S is conveyed from the inversion tray 308, along the double-sided path 310, by the conveying rollers 307 and 309. At this time, the reference side having the pre-punched holes H faces frontward in the conveying direction. Then, the pre-punched sheet S is conveyed into the printing section 303 again by the conveying roller 311, and a front-side image is printed on the second surface. Referring to FIG. 5B, a white triangle mark M2 indicates the second surface of the sheet (pre-punched sheet S), on which the front-side image is formed. After that, the pre-punched sheet S is guided by the conveying roller 304 and is discharged onto the discharge tray 305.

An output result 512 (see FIG. 5A) is a deliverable formed by the pre-punched sheets S discharged onto the discharge tray 305. The reference side along which punched holes are formed of each pre-punched sheet S of the output result 512 faces frontward in the conveying direction. The reverse-side images printed on the first surfaces (images P2, P4, and P6) face upward, and the front-side images printed on the second surfaces (images P1, P3, and P5) face downward, which mean that the sheets are discharged by face-down discharge. The output result 512 is "right-side punching output" in which the punched holes H are positioned on the right side of the front-side image. Therefore, when the pre-punched sheets S are set in the sheet feeder 301 such that they are oriented in the same direction as in the single-sided printing job, the positions of the punched holes H are reversed right and left from that in the single-sided printing job.

Figure 6A:
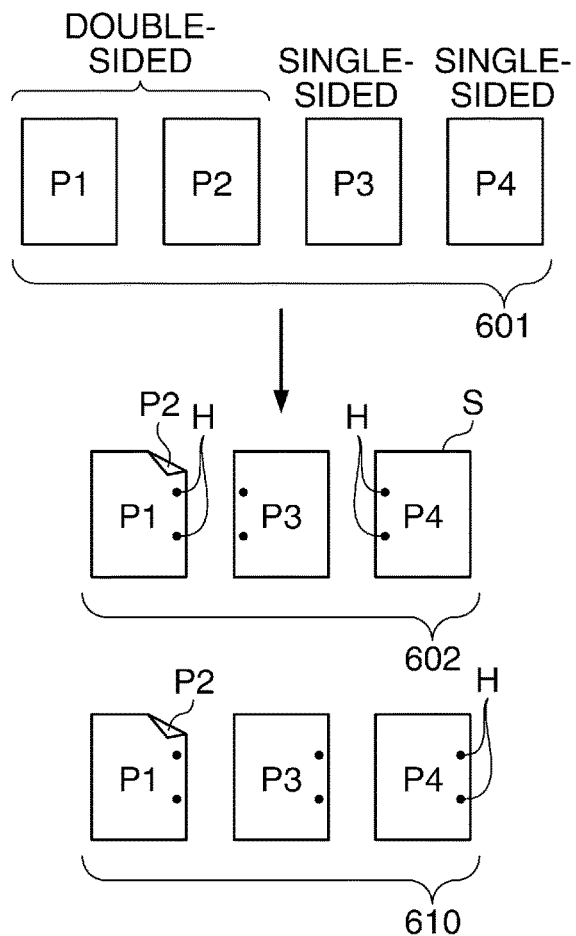
FIG. 6A is a schematic diagram of sheets on which double-sided printing and single-sided printing are performed.
Figure 6B:
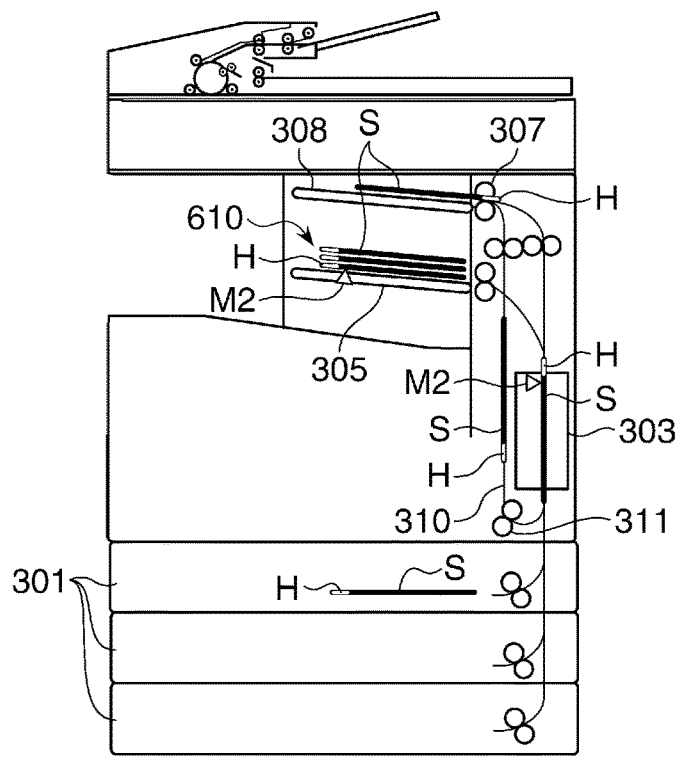
FIG. 6B is a cross-sectional view of the image forming apparatus during execution of a mixed job.

FIG. 6A is a schematic diagram of sheets on which double-sided printing and single-sided printing are conventionally performed, and FIG. 6B is a cross-sectional view of the image forming apparatus 102 during execution of a mixed job. The mixed job is a print job mixedly including double-sided printing and single-sided printing. A description will be given of an example in which four pages of input images 601 are printed on the pre-punched sheets S according to the mixed job. In the print settings set for the job, out of the input images 601, the images P1 and P2 are set to double-sided printing, and the images P3 and P4 are set to single-sided printing.

First, let it be assumed that double-sided printing of the images P1 and P2 set to double-sided printing is performed in the same manner as in the example shown in FIGS. 5A and 5B, and single-sided printing of the images P3 and P4 set to single-sided printing is performed in the same manner as in the example shown in FIGS. 4A to 4C. More specifically, when the images P1 and P2 are printed, a pre-punched sheet S is conveyed in the inversion conveying mode, whereby a reverse-side image (image P2) is printed on the first surface of the pre-punched sheet S, and a front-side image (image P1) is printed on the second surface of the pre-punched sheet S, whereafter the pre-punched sheet S is discharged by face-down discharge. Further, when each of the images P3 and P4 is printed, a pre-punched sheet S is conveyed in the direct conveying mode, whereby a front-side image (image P3 or P4) is printed on the first surface of the pre-punched sheet S, whereafter the pre-punched sheet S is discharged by face-down discharge. As a result, a deliverable illustrated by an output result 602 is obtained. The images P1 and P2 are formed on opposite sides of one pre-punched sheet S, and the images P3 and P4 are formed on the respective first surfaces of pre-punched sheets S. The images P3 and P4 result in images formed on sheets of left-side punching output in which the punched holes H are positioned on the left side of the front-side image (image P3, P4). However, the images P1 and P2 result in images formed on a sheet of right-side punching output in which the punched holes H are positioned on the right side of the front-side image (image P1). Therefore, the sheet output as a result of single-sided printing and the sheet output as a result of double-sided printing do not match in the positions of the punched holes H in the lateral direction.

In view of this, to align the positions of the punched holes H between the results of single-sided printing and double-sided printing, the double-sided printing of the images P1 and P2 set to double-sided printing is performed in the same manner as in the example shown in FIGS. 5A and 5B, whereas the single-sided printing of the images P3 and P4 set to single-sided printing is performed in a different manner from the example shown in FIGS. 4A to 4C. More specifically, let it be assumed that when each of the images P3 and P4 is printed, a pre-punched sheet S is conveyed in the inversion conveying mode, and also a front-side image is printed on the second surface of the pre-punched sheet S, whereafter the pre-punched sheet S is discharged by face-down discharge. This gives an output result 610 as a deliverable. More specifically, for the images P3 and P4, although each pre-punched sheet S is conveyed into the printing section 303 for the first time in a state in which the reference side along which the punched holes H are formed faces rearward in the conveying direction (not shown), the pre-punched sheet S is conveyed to the inversion tray 308 without having an image printed on the first surface. The pre-punched sheet S in an inverted state in the inversion tray 308 is conveyed therefrom along the double-sided printing path 310, and is conveyed into the printing section 303 again by the conveying roller 311, where the front-side image is printed on the second surface. Then, the pre-punched sheet S is discharged onto the discharge tray 305.

In this case, the pre-punched sheet S is conveyed along the same pathway as in double-sided printing, and hence the positions of the punched holes H are the same as those of a result of double-sided printing. As indicated by the output result 610, the images P1 and P2 result in images formed on opposite sides of a sheet of right-side punching output in which the punched holes H are positioned on the right side of the front-side image (image P1), similar to the output result 602. Further, the images P3 and P4 also result in images formed on respective sheets of right-side punching output in which the punched holes H are positioned on the right side of the front-side image (image P3, P4). Therefore, it is possible to cause the positions of the punched holes H in the lateral direction to match between the output results of single-sided printing and double-sided printing.

In general, it is desirable to obtain sheets of left-side punching output in which the punched holes positioned on the left side when the front-side image is viewed from the front. However, to cope with this by a method of setting the sheets in the sheet feeder 301, it is necessary to set the sheets in the sheet feeder 301 such that the punched holes H are positioned on the right side. On the other hand, as shown in FIGS. 4A to 4C, for a single-sided printing job, it is suitable to set the sheets in the sheet feeder 301 such that the punched holes H are positioned on the left side. Therefore, depending on a print job, the positions of the punched holes H are not on the same side. Further, it is easy for users to understand how to set the sheets, assuming that the pre-punched sheets are required to be set in the sheet feeder 301, such that the reference side faces toward the left when left-side punching output is desired, whereas such that the reference side faces toward the right when right-side punching output is desired.

Accordingly, in the present embodiment, image rotation is made use of so as to make it possible to make uniform the orientation of the pre-punched sheets S set in the sheet feeder between printing of a double-sided printing job and printing of a mixed job, and make uniform the side where the punched holes H are positioned, in a deliverable. This method will be described with reference to FIGS. 7A to 9C.

Figure 7A:
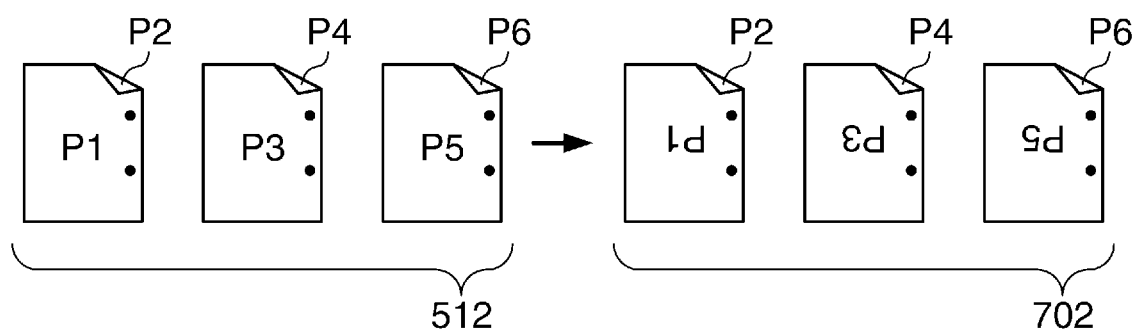
FIG. 7A is a diagram showing a change in a deliverable made by application of image rotation to a double-sided printing job.
Figure 7B:
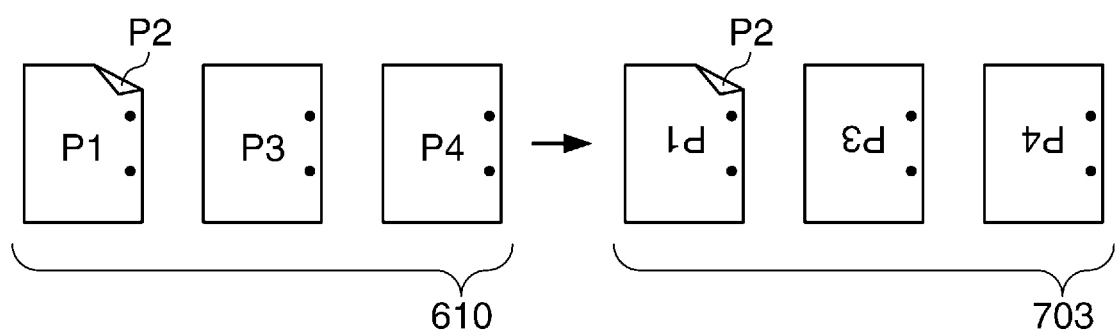
FIG. 7B is a diagram showing a change in a deliverable made by application of image rotation to a mixed job.

FIGS. 7A and 7B are diagrams useful in explaining changes in deliverables made by application of image rotation to a double-sided printing job and a mixed job, respectively, for printing of images on pre-punched sheets S. The following description is given of the outline: When double-sided printing of the input images 501 on the pre-punched sheets S is performed according to the double-sided printing job (see FIGS. 5A and 5B), all images are printed after being rotated through 180°. By doing this, in place of the output result 512, an output result 702 is obtained in which the sheets are all in left-side punching output. Further, when printing of the input images 601 on the pre-punched sheets S is performed according to the mixed job (see FIGS. 6A and 6B), all images are printed after being rotated through 180°. By doing this, in place of the output result 610, an output result 703 is obtained in which the sheets are all in left-side punching output. What is more, as for the output results 702 and 703, there is a match between the orientation of the side, along which the punched holes H are formed, of each pre-punched sheet S which is set in the sheet feeder 301, and the orientation of the side, along which the punched holes H are formed, of each pre-punched sheet S which is discharged onto the discharge tray 305. The control for obtaining these print results will be described with reference to FIG. 8.

Figure 8:
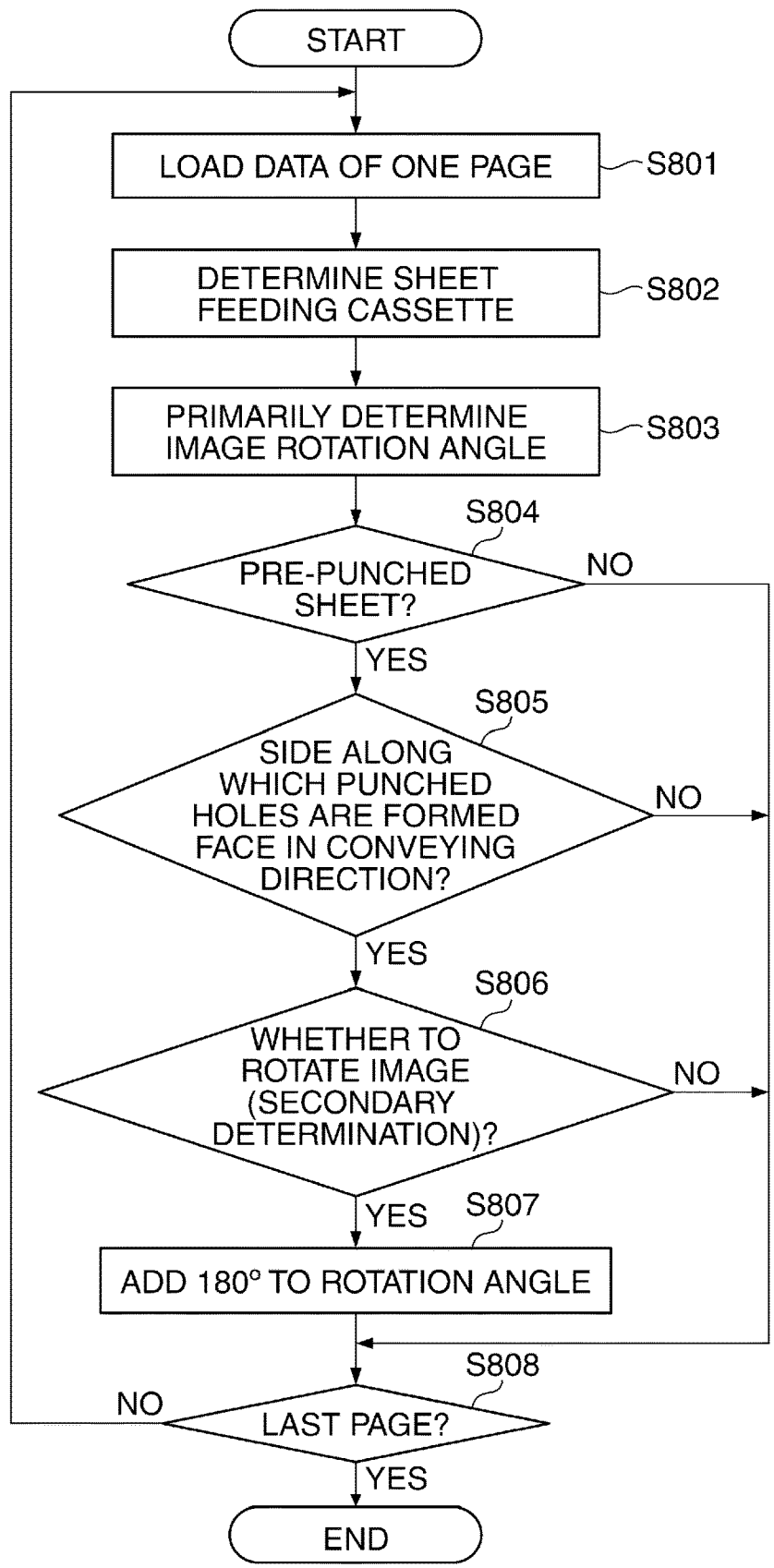
FIG. 8 is a flowchart of an image rotation angle determination process.

FIG. 8 is a flowchart of an image rotation angle determination process. The program of the present process for the image forming apparatus 102 is stored in the ROM 118, and is executed by the CPU 116 that loads the program into the RAM 117. This process is started when a print job is input.

First, the CPU 116 loads one page of data in a job into the RAM 117 (step S801). Next, the CPU 116 determines a sheet feeder to be used for printing (step S802). In this step, the CPU 116 determines the sheet feeder by taking into account a sheet type set for the job and the order of priorities of the sheet feeders. For the sheet feeder used for printing, normally, one of the plurality of sheet feeders 301 is selected, but when the second surface is to be printed by double-sided printing, none of the sheet feeders 301 is selected, but the inversion tray 308 is determined as the sheet feeder.

Next, the CPU 116 performs primary determination of an image rotation angle, assuming that processing for sheets including normal sheets is to be performed (step S803). In this step, the image rotation angle determined by primary determination takes one of values of 0° (normal image) and 180° (inverted image) according to a specification, in print settings, as to the orientation of an image on the reverse side in double-sided printing. For a double-sided printing job, the image rotation angle is determined based on the specification of the orientation of an image on the reverse side. For a mixed job, in a case where a page being under the current processing corresponds to a page to be subjected to double-sided printing, the image rotation angle is determined based on the specification of the orientation of an image on the reverse side.

Figure 9A:
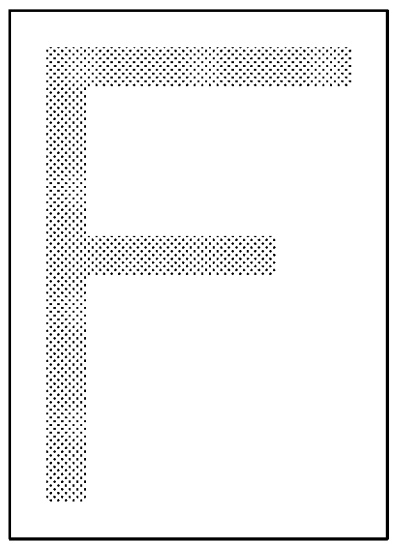
FIGS. 9A to 9C are diagrams showing examples of the layout on both sides of a sheet.
Figure 9B:
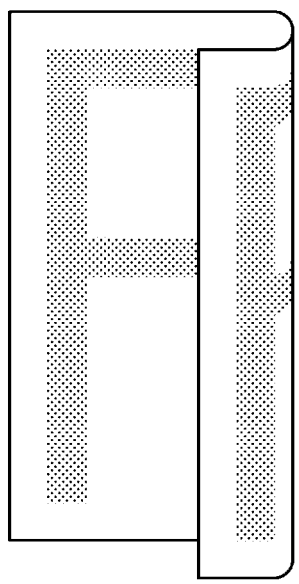
Figure 9C:
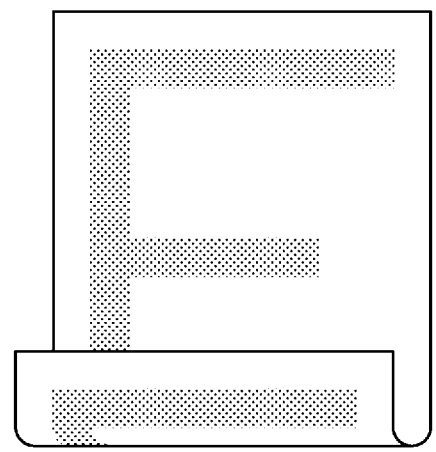

FIGS. 9A to 9C are diagrams showing an example of the layout on opposite sides of a sheet. In FIGS. 9A to 9C, an image "F" is written so as to easily grasp the orientation of an image transmitted from the host computer 101. In FIG. 9A, the image F is a normal image and the rotation angle is 0°. In the layout shown in FIG. 9B, a page turning direction is set to a lateral direction in the settings of double-sided printing. Since the sheet is turned in the lateral direction, the image F is the normal image on both of the front side and the reverse side, and hence the rotation angle is 0°. In the primary determination, the image rotation angle is determined as 0° with respect to each of the front side and the reverse side. In the layout shown in FIG. 9C, the page turning direction is set to a vertical direction in the settings of double-sided printing. Since the sheet is turned in the vertical direction, the image F is the normal image on the front side, and hence the rotation angle is 0°, but the image F is the inverted image on the reverse side, and hence the rotation angle is 180°. Therefore, the image rotation angle is determined as 0° with respect to the front side, and as 180° with respect to the reverse side.

However, the image rotation angle is not limitedly determined based on a setting concerning the reverse side in double-sided printing, but may be determined according to any other suitable layout function. Although it is assumed that an image with an image rotation angle of 0° is received from the host computer 101, if an image set to an image rotation angle of 0° is not received, the image rotation angle may be determined, in a manner adapted to a sheet, in the step S803. Therefore, a value which can be taken as the image rotation angle is not limited to 0° and 180°, but may be set to any other angle.

Next, in a step S804, the CPU 116 checks sheets in the sheet feeder 301 determined in the step S802 to determine whether or not the sheets are pre-punched sheets S. This is determined, for example, based on the type of sheets registered as information on the determined sheet feeder 301. The registered information of the sheet type is stored e.g. in the HDD 119. A sensor for detecting whether or not a sheet is formed with punched holes may be provided to determine, based on a result of the detection, whether or not the sheet is a pre-punched sheet S. If it is determined in the step S804 that the sheets in the determined sheet feeder are not pre-punched sheets S, the CPU 116 proceeds to a step S808. In this case, the image rotation angle determined by the primary determination is not further changed (secondary determination). On the other hand, if the sheets in the determined sheet feeders are pre-punched sheets S, the CPU 116 determines whether or not a side of the pre-punched sheet S where the punched holes H are formed faces forward or rearward in the conveying direction (step S805).

Note that the orientation of a side along which the punched holes H are formed is determined in the registered sheet settings for each sheet feeder 301. Here, it is assumed that the pre-punched sheets S are set in a sheet feeder 301 such that the reference side along which the punched holes H are formed faces toward a predetermined direction, and the CPU 116 acquires the orientation of the reference side from the sheet settings. Note that if the determined sheet feeder is the inversion tray 308, the CPU 116 acquires the orientation of the reference side from the sheet settings set for a sheet feeder having fed the sheet this time. Further, a sensor for detecting presence and the positions of punched holes may be provided to acquire the orientation of the reference side from a result of the detection. If it is determined in the step S805 that the reference side along which the punched holes H are formed does not face forward or rearward in the conveying direction, but for example, faces in a direction orthogonal to the conveying direction, the CPU 116 proceeds to the step S808. On the other hand, if the reference side along which the punched holes H are formed faces forward or rearward in the conveying direction, the CPU 116 proceeds to a step S806.

In the step S806, the CPU 116 determines whether or not the image is to be rotated. The CPU 116 functions as a controller in the present invention. The determination performed in this step is secondary determination for determining whether or not an image obtained by rotating the input image through the rotation angle determined by the primary determination is to be further rotated. This determination is different depending on a print job and a page for the current processing in the print job, as described in the following.

First, in a case where the print job is a single-sided printing job (without including double-sided printing) (as in the illustrated example in FIGS. 4A to 4C), it is determined that the image is not to be rotated. This is because the left-side punching output can be obtained by the conventional operation described with reference to FIGS. 4A to 4C. Further, in a case where the print job is a double-sided printing job (without including single-sided printing) (as in the illustrated example in FIGS. 5A and 5B), the CPU 116 determines that the images (front-side image and reverse-side image) are to be rotated irrespective of whether the page for the current processing is the front page or the reverse page. This determination is made in order to obtain a left-side punching output, such as the output result 702 (in FIG. 7A). Further, in a case where the print job is a mixed job (mixedly including single-sided printing and double-sided printing) (as in the illustrated example in FIGS. 6A and 6B), the CPU 116 determines that the image is to be rotated when the page for the current processing is a page to be subjected to double-sided printing in the mixed job. Here, a page to be subjected to double-sided printing in the mixed job is a page corresponding to double-sided printing, i.e. either the reverse side or the front side of the both sides of a sheet. On the other hand, in a case where the print job is a mixed job, even when the page for the current processing is a page to be subjected to single-sided printing (the front side only), the CPU 116 also determines that the image is to be rotated. This is to obtain such a left-side punching output as the output result 703 (in FIG. 7B).

If it is determined that the image is not to be rotated in the step S806, the CPU 116 proceeds to the step S808, whereas if it is determined that the image is to be rotated, the CPU 116 proceeds to a step S807. In the step S807, the CPU 116 adds 180° to the image rotation angle determined by the primary determination in the step S803, and the remainder obtained by dividing the obtained value by 360° is set as a final image rotation angle. This final image rotation angle is reflected on printing of the page for the current processing whereby the image is rotated and printed. As a result, such deliverables as the output results 702 and 703 (see FIGS. 7A and 7B) are obtained. Next, the CPU 116 determines whether or not the page for the current processing is the last page in the print job (step S808). If it is determined in the step S808 that the page for the current processing is not the last page, the CPU 116 returns to the step S801, whereas if the page for the current processing is the last page, the CPU 116 terminates the process in FIG. 8.

According to the present embodiment, when the sheets set in the sheet feeder 301 are pre-punched sheets S, the CPU 116 performs determination (secondary determination) as to whether or not the image is to be rotated, based on the orientation of a side (reference side) along which the punched holes H are formed. Then, if it is determined that the image is to be rotated when performing double-sided printing (printing for a double-sided printing job or double-sided printing in a mixed job), the CPU 116 performs control such that the reverse-side image and the front side image are formed after being rotated through 180°. This makes it possible to cause the orientation of the side (reference side) along which the punched holes H are formed and the orientation of the output image to match in double-sided printing. Particularly, when the reference side along which the punched holes H are formed faces forward or rearward in the conveying direction, it is determined that the image is to be rotated. Therefore, it is possible to cause the orientation of the reference side along which the punched holes H are formed and the orientation of the output image to match in double-sided printing, in a situation in which the orientation of a side along which the punched holes H are formed affects the orientation of the output image. Further, also in the mixed job, it is possible to cause the orientation of the reference side along which the punched holes H are formed and the orientation of the output image to match, by making uniform the orientation of sheets set in the sheet feeder between double-sided printing and single-sided printing. What is more, in printing images for the double-sided printing job or the mixed job, it is possible to cause the reference side along which the punched holes H are formed to face (be oriented) in the same direction between the pre-punched sheet S set in the sheet feeder 301 and the output result.

On the other hand, when performing single-sided printing in the single-sided printing job without including double-sided printing, it is determined that the image is not to be rotated, and the pre-punched sheet S is directly conveyed in the direct conveying mode without using the double-sided path 310, to thereby print the front-side image for single-sided printing on the first surface of the sheet S. This makes it possible to give the priority to the output efficiency without using the double-sided printing path 310 when performing printing of images according to a job only including single-sided printing.

Next, a second embodiment of the present invention will be described. In the first embodiment, when a user desires to obtain a left-side punching output in printing of a double-sided printing job or a mixed job, pre-punched sheets S are set in the sheet feeder 301 such that the punched holes H are positioned on the left side. In the second embodiment, sheets are more flexibly set in the sheet feeder 301. The second embodiment will be described by adding FIGS. 10 and 11 to the first embodiment and replacing FIG. 8 by FIGS. 12 and 13. In the present embodiment, a setting of the orientation of pre-punched sheets S to be set in the sheet feeder 301 (positions of the punched holes H) is made, and also in a print job input from the host computer 101, a specification of the positions of punched holes H with respect to an image is made. By making a match between the orientation of a side, along which the punched holes H are formed, of the pre-punched sheet S set in the sheet feeder 301 and the orientation of a side along which the punched holes H are formed, which is specified in a setting of the print job, the optimum output result is obtained.

Figure 10:
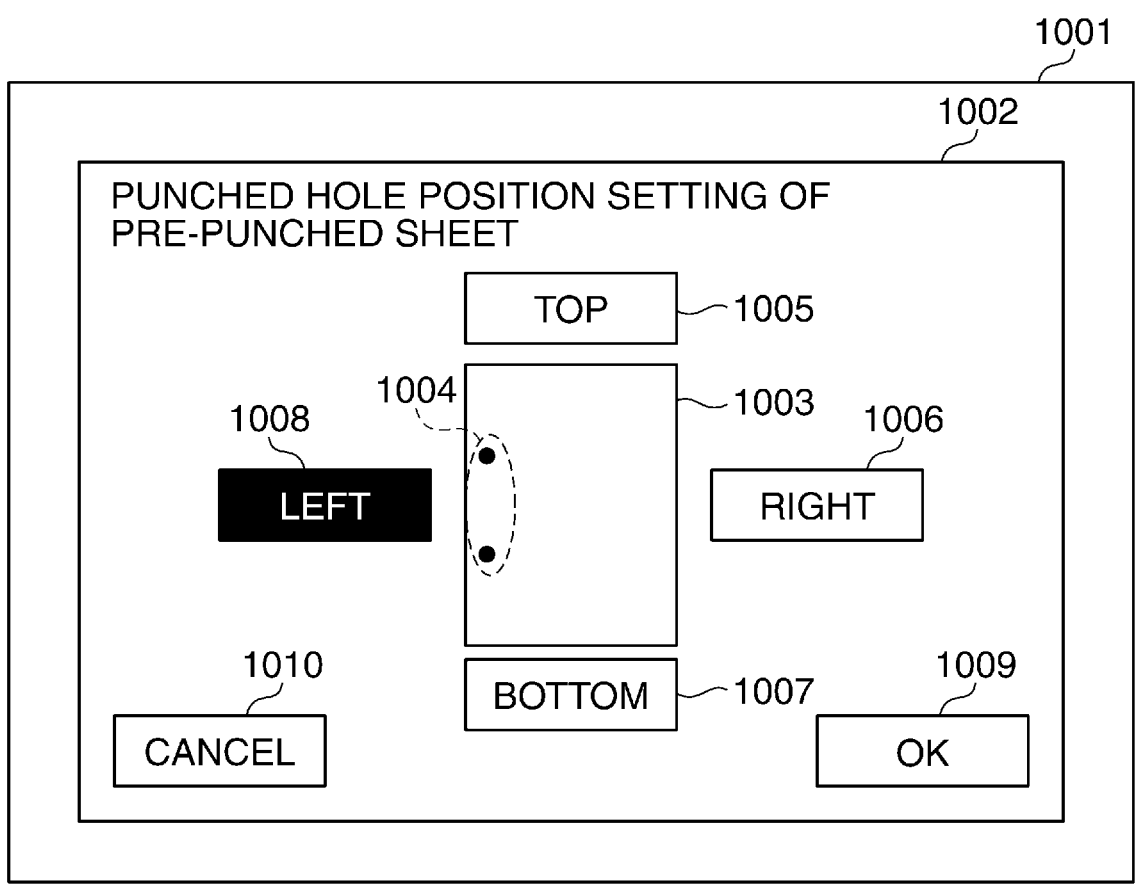
FIG. 10 is a diagram showing a punched hole position-setting screen displayed on an image forming apparatus according to a second embodiment of the present invention.

FIG. 10 is a diagram showing a punched hole position-setting screen displayed on the image forming apparatus 102 according to the second embodiment. The punched hole position-setting screen, denoted by reference numeral 1002, is displayed on the touch panel, denoted by reference numeral 1001, of the console section 123, in a case where a setting of pre-punched sheets is made as one of sheet settings for the sheet feeder 301. An orientation specification section 1003 substantially indicates an orientation of the pre-punched sheet. A punched hole position 1004 indicates a side along which the punched holes are formed (reference side) out of four sides of the pre-punched sheet. FIG. 10 shows an example of settings made in a case where the pre-punched sheets are set in the sheet feeder 301 in a state in which the side along which the punched holes are formed is oriented toward the left side. Punched hole position-setting keys 1005 to 1008 are keys for setting the position of pre-punched holes, and are capable of setting the position of pre-punched holes in one of top, bottom, right, and left margins. The punched hole position-setting keys 1005 to 1008 each toggle, and the left key 1008 is selected in the example illustrated in FIG. 10. The display of the position of the punched hole position 1004 is changed in accordance with selection of the punched hole position-setting keys 1005 to 1008. An OK key 1009 is pressed for closing the screen after causing the setting made on the setting screen 1002 to be reflected on the settings of the sheet feeder 301. A cancel key 1010 is pressed for closing the screen without causing the setting made on the setting screen 1002 to be reflected on the same.

Figure 11:
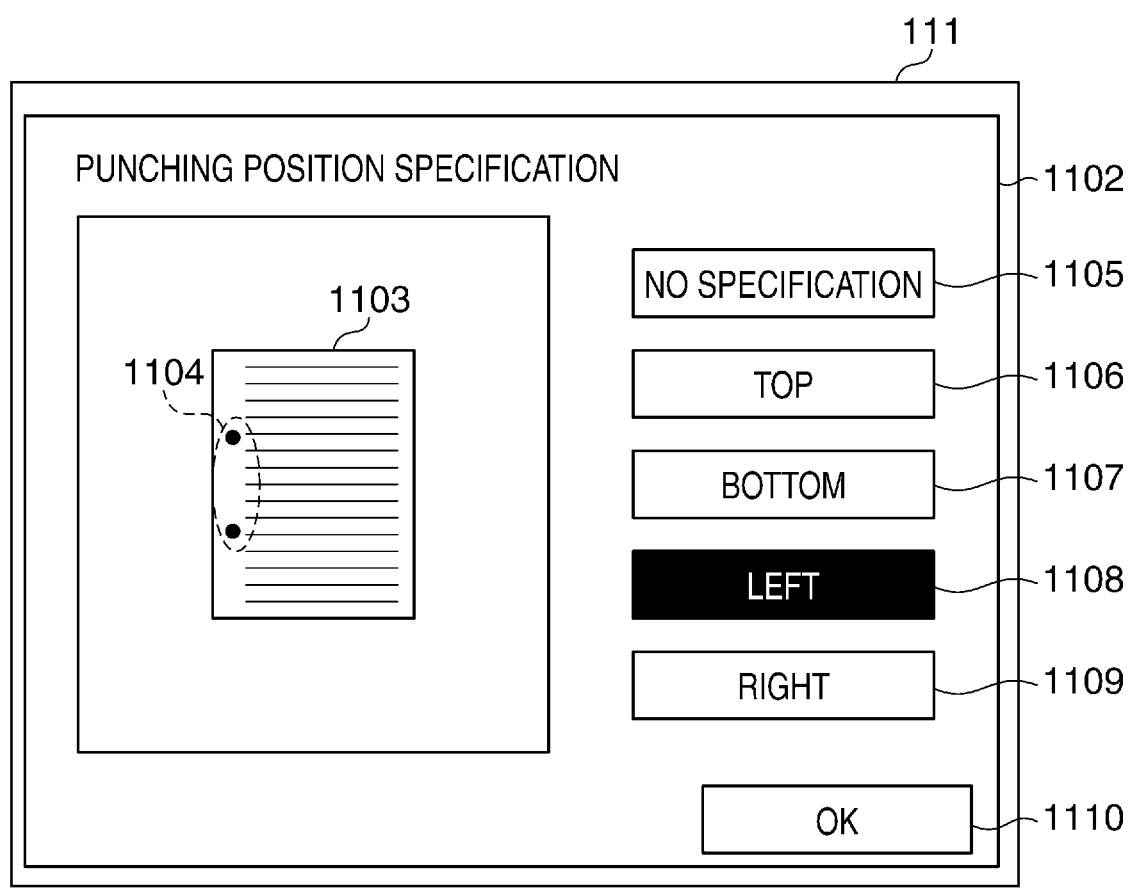
FIG. 11 is a diagram showing a punching position-specifying screen displayed by a printer driver.

FIG. 11 is a diagram showing a punching position-specifying screen displayed by the printer driver 203. In the present embodiment, a punching position is specified by the printer driver 203, and in a case where sheets to be fed are pre-punched sheets, the punching position is the position of the punched holes H of the pre-punched sheet. The punching position-specifying screen, denoted by reference numeral 1102, is displayed on the display 111 when settings of a print job are made by the host computer 101. A simple preview 1103 shows a layout of an image on a sheet. A punching hole position 1104 indicates the punching position on the sheet. In FIG. 11, left-side punching is specified. A cancel key 1105 is pressed when a user cancels the setting without specifying a punching position. Punching position-specifying keys 1106 to 1109 are keys for specifying the position of punched holes, and are capable of setting the punching position in one of top, bottom, right, and left margins. The punching position-specifying keys 1106 to 1109 each toggle, and the left key 1108 is selected in the illustrated example in FIG. 11. The position of display of the punching hole position 1104 is changed in accordance with selection of punching positions specification keys 1106 to 1109. An OK key 1110 is pressed when closing the screen after causing the setting made on the punching position-specifying screen 1102 to be reflected on the print settings.

Figure 12:
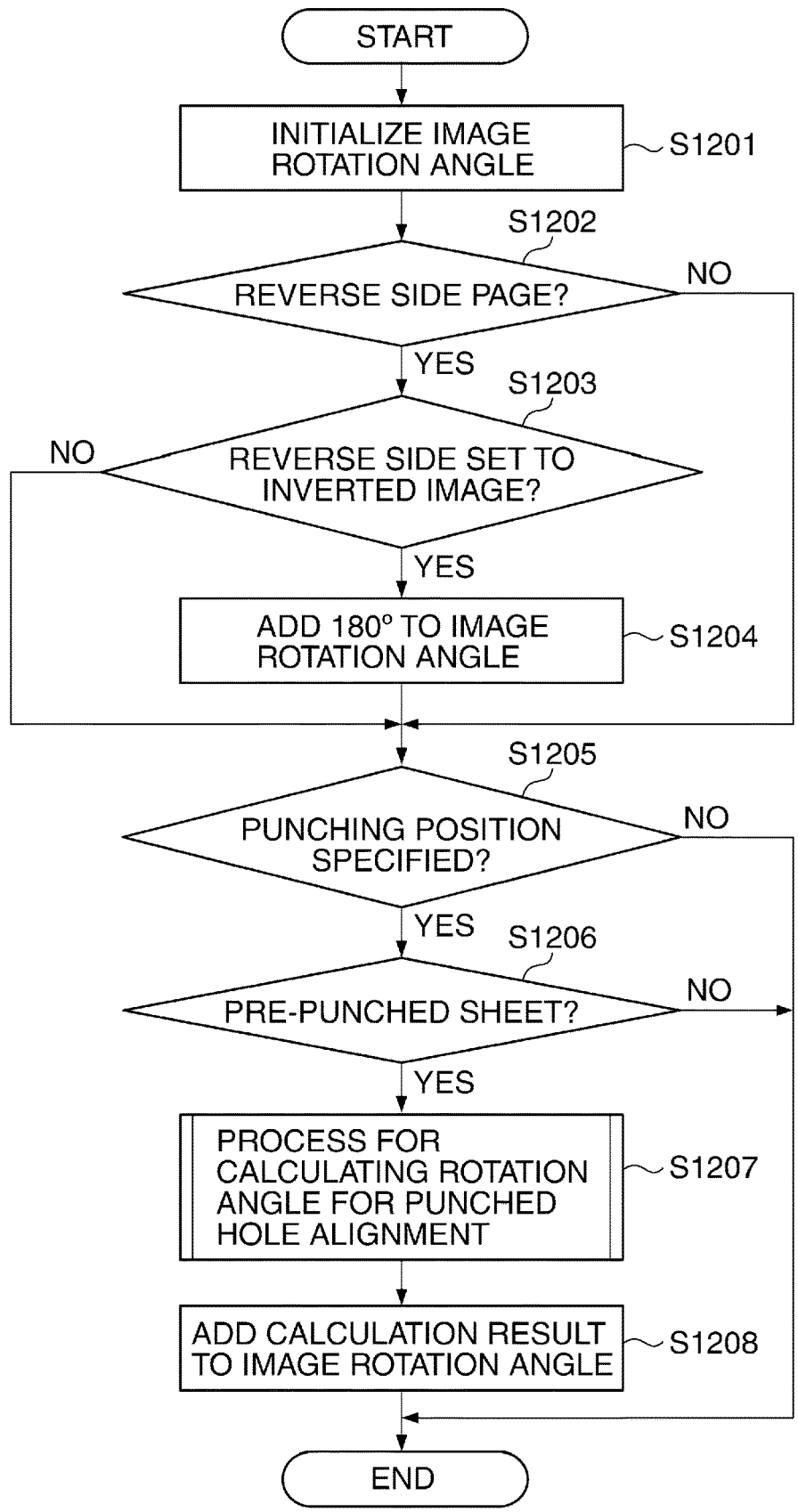
FIG. 12 is a flowchart of an image rotation angle determination process performed in the second embodiment.

FIG. 12 is a flowchart of an image rotation angle determination process performed in the second embodiment.

First, in a step S1201, the CPU 116 initializes the rotation angle of an image of data read into the RAM 117 to 0°. Next, the CPU 116 determines whether or not the page for the current processing is a reverse-side page (page to be laid out on the reverse side) in double-sided printing (step S1202). If it is determined in the step S1202 that the page for the current processing is not a reverse-side page in double-sided printing, the CPU 116 proceeds to a step S1205. On the other hand, if the page for the current processing is a reverse-side page in double-sided printing, the CPU 116 determines whether or not an image on the reverse-side page is set to an inverted image in the settings of double-sided printing (step S1203). If it is determined in the step S1203 that the image on the reverse-side page is set to a normal image, the CPU 116 proceeds to the step S1205, whereas if the image on the reverse-side page is set to an inverted image, the CPU 116 proceeds to a step S1204. In the step S1204, the CPU 116 adds 180° to the rotation angle of the image, and proceeds to the step S1205.

In the step S1205, the CPU 116 determines whether or not the punching position is specified in the job output from the printer driver 203. If it is determined in the step S1205 that the punching position is not specified in the job, the CPU 116 terminates the process in FIG. 12, whereas if the punching position is specified, the CPU 116 proceeds to a step S1206. In the step S1206, similar to the step S804, the CPU 116 checks sheets in the sheet feeder 301 determined in the step S802 to determine whether or not the sheets are pre-punched sheets S. If it is determined in the step S1206 that sheets in the determined sheet feeder are not pre-punched sheets S, the CPU 116 terminates the process in FIG. 12, whereas if sheets in the determined sheet feeder are pre-punched sheets S, the CPU 116 proceeds to a step S1207.

In the step S1207, the CPU 116 performs a process for calculating a rotation angle for punched hole alignment, as described hereinafter with reference to FIG. 13, to thereby acquire a punched hole alignment rotation angle. That is, the CPU 116 calculates a rotation angle for causing the punching positions specified on the punching position-specifying screen 1102 (see FIG. 11), set by the printer driver 203, to match the position of pre-punched holes in the pre-punched sheet S set in the sheet feeder 301, set on the setting screen 1002 (see FIG. 10). Next, in a step S1208, the CPU 116 adds the punched hole alignment rotation angle acquired by calculation in the step S1207 to the image rotation angle, followed by terminating the process in FIG. 12.

FIG. 13 is a flowchart of the process for calculating a rotation angle for punched hole alignment, which is performed in the step S1207 of the image rotation angle determination process in FIG. 12. In a step S1301, the CPU 116 initializes the punched hole alignment rotation angle to 0°. In a step S1302, the CPU 116 converts the punching position specified on the punching position-specifying screen 1102 (see FIG. 11) and the position of pre-punched holes set on the setting screen 1002 (see FIG. 10) to angles, respectively. In the present embodiment, with respect to both of the punching position and the position of pre-punched holes, the CPU 116 converts the position of top punching in which punched holes are formed in the top margin, the position of right punching in which punched holes are formed in the right margin, the position of bottom punching in which punched holes are formed in the bottom margin, and the position of left punching in which punched holes are formed in the left margin to 0°, 90°, 180°, and 270°, respectively.

Next, in a step S1303, the CPU 116 compares values of angles obtained by conversion in the step S1302, and determines whether or not an angle value converted from the punching position is larger than an angle value converted from the position of pre-punched holes. If it is determined in the step S1303 that the angle value converted from the punching position is larger than the angle value converted from the position of pre-punched holes, the CPU 116 proceeds to a step S1305, whereas if not, the CPU 116 proceeds to a step S1304. In the step S1304, the CPU 116 adds 360° to the angle value converted from the position of pre-punched holes, and proceeds to the step S1305. In the step S1305, the CPU 116 subtracts the angle value converted from the punching position from the angle value converted from the positions of pre-punched holes, and sets a result of the calculation as the punched hole alignment rotation angle. Therefore, the punched hole alignment rotation angle is a rotation angle required to cause the punching position (orientation of the input image) specified as a setting of the print job to match the position of pre-punched holes (orientation of the reference side) set as one of the sheet settings.

According to the present embodiment, it is possible to obtain the same advantageous effects as provided by the first embodiment in aligning the position of the punched holes H (or the reference side) and the orientation of the output image in double-sided printing. Further, in a case where the orientation of the pre-punched sheet S set in the sheet feeder 301 is set as one of the sheet settings, it is possible to align the orientation of the pre-punched sheets S set in the sheet feeder 301 and the orientation of the input image specified as a setting of the print job.

Although in the above-described embodiments, the predetermined angle by which the image is rotated when it is determined to rotate the input image is set to 180° in a case where the reference side does not face forward or rearward in the conveying direction, the predetermined angle is not limited to 180°. For example, the predetermined angle may be set to 180°+360°, or 180°-360°.

Although the CPU 116 determines whether or not the input image is to be rotated, based on the direction in which the reference side faces (orientation of the reference side), the reference side used for this determination is not limited to a side along which the punched holes H are formed, but may be a side opposed to the side along which the punched holes H are formed. Further, although the pre-punched sheet S is used as a predetermined sheet having directional properties with respect to the orientations of four sides by way of example, this is not limitative, but for example, a pre-printed sheet may be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-193426 filed Sep. 30, 2015, which is hereby incorporated by reference herein in its entirety.

What is claimed is:

1. An image forming apparatus comprising:
a sheet feeder configured to feed a pre-punched sheet having punched holes;
a printer configured to print an image on the pre-punched sheet fed from said sheet feeder;
a conveying unit having a double-sided conveying path configured to invert the pre punched sheet which passed through the printer and to convey the pre-punched sheet into said printer along the double-sided conveying path;
a discharge tray to which the pre-punched sheet is discharged; and
a controller configured to selectively execute one of printing modes including a single-sided printing mode and a double-sided printing mode, the single-sided printing mode being a mode where after an image is printed on a first surface of the pre-punched sheet fed from said sheet feeder, the pre-punched sheet is discharged to the discharge tray without being conveyed through the double-sided conveying path, and the double-sided printing mode being a mode where after a reverse-side image is printed on a first surface of the pre-punched sheet fed from said sheet feeder, a front-side image is printed on a second surface of the pre-punched sheet conveyed through the double-sided conveying path, wherein said controller is configured to acquire orientation information indicating an orientation of the pre-punched sheet set in said sheet feeder, and to determine an image rotation angle based on the acquired orientation information and a selected one of the printing modes, such that:

(a) in a case where the acquired orientation information indicates that the pre-punched sheet is set in said sheet feeder such that it is oriented in a first orientation:

(i) when the selected one of the printing modes is the single sided printing mode, said controller is configured to determine 0° as the image rotation angle for the image to be printed on the first surface of the pre-punched sheet; and (ii) when the selected one of the printing modes is the double sided printing mode, said controller is configured to determine 0° as the image rotation angle for one of the front-side image and the reverse-side image and to determine 180° as the image rotation angle for the other one of the front-side image and the reverse-side image, and (b) in a case where the acquired orientation information indicates that the pre-punched sheet is set in said sheet feeder such that it is oriented in a second orientation:

(i) when the selected one of the printing modes is the single sided printing mode, said controller is configured to determine 180° as the image rotation angle for the image to be printed on the first surface of the pre-punched sheet; and (ii) when the selected one of the printing modes is the double sided printing mode, said controller is configured to determine 0° as the image rotation angle for each of the front-side image and the reverse-side image, and wherein the first orientation is an orientation where punched holes are disposed at a trailing end of the pre-punched sheet, and the second orientation is an orientation where the punched holes are disposed at a leading end of the pre-punched sheet.

2. The image forming apparatus according to claim 1, wherein the punched holes are formed along a reference side of four sides of the sheet.

3. The image forming apparatus according to claim 2, wherein when the reference side is parallel with a sheet conveying direction, said controller controls said printer to print an image for double-sided printing without rotation by 180 degrees.

4. The image forming apparatus according to claim 2, wherein when the reference side is orthogonal to a sheet conveying direction, said controller rotates an image for double-sided printing by 180 degrees and controls said printer to print the image on a sheet.

5. The image forming apparatus according to claim 1, wherein the punched holes are symmetrical.

6. The image forming apparatus according to claim 1, further comprising a second sheet feeder configured to feed a sheet in which punched holes are not formed, wherein when an image is printed on a sheet fed from said second sheet feeder, said controller controls said printer to print an image for double-sided printing without rotation by 180 degrees.

7. The image forming apparatus according to claim 1, further comprising a reception unit configured to receive a print job mixedly including double-sided printing and single-sided printing.

8. The image forming apparatus according to claim 1, wherein the controller is configured to rotate the image for double-sided printing by 180 degrees and control said printer to print the rotated image regardless of whether or not the image for double-sided printing is included in a print job that includes images for single-sided printing.

* * * * *